United States Patent
Tsengas et al.

(10) Patent No.: US 6,817,315 B1
(45) Date of Patent: Nov. 16, 2004

(54) CAT LITTER

(76) Inventors: Steven Tsengas, 1209 East St., Fairport Harbor, OH (US) 44077; John S. Teuscher, 949 W. Washington, Pittsfield, IL (US) 62363

( * ) Notice: Subject to any disclaimer, the term of this patent is extended or adjusted under 35 U.S.C. 154(b) by 27 days.

(21) Appl. No.: 10/264,223

(22) Filed: Oct. 3, 2002

Related U.S. Application Data

(60) Provisional application No. 60/405,872, filed on Aug. 26, 2002.

(51) Int. Cl.$^7$ .............................................. A01K 29/00
(52) U.S. Cl. ....................................................... 119/171
(58) Field of Search ................................ 119/171, 172, 119/173; 502/400, 401

(56) References Cited

U.S. PATENT DOCUMENTS

| | | |
|---|---|---|
| RE28,700 E | 1/1976 | Berger |
| 3,968,253 A | 7/1976 | Bertram et al. |
| 4,015,026 A | 3/1977 | Burkwall, Jr. et al. |
| 4,044,169 A | 8/1977 | Bertram et al. |
| 4,309,254 A | 1/1982 | Dahlstrom et al. |
| 4,437,429 A * | 3/1984 | Goldstein et al. ........... 119/173 |
| 4,560,527 A | 12/1985 | Harke et al. |
| 4,721,059 A | 1/1988 | Lowe et al. |
| 4,828,846 A | 5/1989 | Rasco et al. |
| 5,003,995 A | 4/1991 | Kersey |
| 5,230,305 A | 7/1993 | House |
| 5,242,292 A | 9/1993 | Wenger |
| 5,250,182 A | 10/1993 | Bento et al. |
| 5,360,823 A | 11/1994 | Griffel, Jr. et al. |
| 5,416,245 A | 5/1995 | MacGregor et al. |
| 5,507,250 A * | 4/1996 | Reddy et al. ................ 119/173 |
| 5,690,052 A | 11/1997 | Sladek |
| 5,730,371 A | 3/1998 | Dongieux, Jr. et al. |
| 5,770,138 A | 6/1998 | Yoder |
| 6,029,394 A | 2/2000 | Kananen et al. |
| 6,041,544 A | 3/2000 | Kananen et al. |
| 6,073,388 A | 6/2000 | Kananen et al. |
| 6,098,569 A | 8/2000 | Kent et al. |
| 6,216,634 B1 | 4/2001 | Kent et al. |

\* cited by examiner

*Primary Examiner*—Michael J. Carone
*Assistant Examiner*—Jordan Lofdahl
(74) *Attorney, Agent, or Firm*—John D. Gugliotta; P. Jeff Martin; Olen L. York, III

(57) ABSTRACT

A cat litter product is provided made substantially from spent distillers' grain substantially removed of starch and combined with modified starch. The combination of spent distiller's grain and modified starch form particles tending to agglomerate when wetted. In addition, zeolite is added to adsorb and desorb water, thus eliminating and preventing mildew formation, and *yucca schidegira* is included as an emulsifying or foaming agent which functions to inhibit urease enzyme action and to prevent the formation of $NH_3$ (ammonia), thereby binding and neutralizing annoying and harmful odors associated therewith. *Yucca schidegira* further serves to help neutralize feces odor.

9 Claims, No Drawings

CAT LITTER

RELATED APPLICATIONS

The present invention was first described in a U.S. Provisional Patent Ser. No. 60/1405,872, filed on Aug. 26, 2002. There are no other previously filed, nor currently any co-pending applications, anywhere in the world.

BACKGROUND OF THE INVENTION

1. Field of the Invention

The present invention relates generally to cat litter and, more particularly, to a cat litter possessing anti-odor and anti-microbial agents which is biodegradable and provides easy cleanup and lessens cat tracking.

2. Description of the Related Art

The cat litter industry is filled with a variety of litters that provide, collectively, a non-toxic and naturally safe, biodegradable, odor-eliminating, scented, anti-bacterial litter that clumps in a convenient size for easy disposal and which has little dust and reduces tracking by cats. Many litter formulas offer some combination of the aforementioned qualities, however, no litter offers each of these advantages in one litter formula.

Accordingly, a need has arisen for an improved cat litter formula offering the aforementioned advantages in one comparably priced formula. The development of the improved cat litter fulfills this need.

The use of non-clay based animal litters is not unknown. There are currently two groups of cat litter formulas that are now commercially available that are based upon the use of grains rather than clay-based litters. The first group is typified by U.S. Pat. No. 5,690,052, issued in the name of Sladek, and U.S. Pat. No. 5,230,305, issued in the name of House. The second group is typified by U.S. Pat. No. 6,216,634 and U.S. Pat. No. 6,098,569, both issued in the name of Kent et al.

In U.S. Pat. No. 5,690,052, a litter is described using as its base material a treated wheat, and more particularly, used only whole raw ground wheat grain that is mechanically processed in order to achieve a 10–17% moisture content and a 250–2500 micron grain size. When formed of a hard red spring wheat, such a mechanically process whole wheat grain can function as a litter by absorbing aqueous fluids (due to the moisture content) and clumping upon receiving pet waste (due to both the particle size AND lack of any added gluten).

Similarly, in U.S. Pat. No. 5,230,305 also describes a process of making litter that uses as its base material a treated wheat. A naturally available wheat product is then modified by impregnating at subatmospheric pressure with a gas such as to reduce density, sugar content and cold water solubles. The gas used is sulfur dioxide, hydrogen chloride, ammonia, chlorine, ethylene oxide, or propylene oxide, which essentially would result in a phase transfer leaching operation.

In U.S. Pat. No. 6,216,634 and U.S. Pat. No. 6,098,569, a litter is described that uses spent grain germ only, and more particularly, spent corn germ. Although the corn germ is described as being pressed or solvent extracted to remove the corn oil, in practice it is the spent corn germ waste from an unrelated corn oil extraction processing operation that is used as the starting point for the litter processing. The corn is cold pressed, and the oil extracted with hexane. Such use of waste stock from one process as raw material for an unrelated process is very well known in industry. The pressed corn germ is then processed mechanically to form discrete granules, after which binding agents and additives are incorporated such as to provide the corn oil process waste with characteristics that are acceptable as cat litter, i.e. fluid absorption and 'clumping' of used litter. Finally, the particles must be ground to the appropriate size.

In sharp contrast to the two groups of cat litter formulas that are now commercially available, the present invention utilizes spent distillers grain as the starting material. Spent distillers' grain is comprised of wheat, corn, rice, barley, or any combination that has previously been used in an alcohol fermentation process. In the alcohol fermentation process, the starch within the grain is converted to alcohol, and the fiber remains and is removed as a waste product. Current uses for this waste product is mainly as animal feed or organic composting material. By itself, spent distillers' grain is not capable of being used as litter by itself, because the lack of starch will not allow for absorption or clumping. Similarly, this lack of starch content in the spent distiller's grain, plus the fact that the oil still remains in the spent grain, makes it incapable of being used as a feedstock for any of the above mentioned prior art processes for converting grain to cat litter.

Consequently, a need has been felt for a cat litter possessing anti-odor and anti-microbial agents which is biodegradable and provides easy cleanup and lessens cat tracking.

SUMMARY OF THE INVENTION

Therefore, it is an object of the present invention to provide an improved cat litter that is non-toxic and naturally safe.

It is another object of the present invention to provide an improved cat litter that is biodegradable.

It is another object of the present invention to provide an improved cat litter that is odor-eliminating.

It is another object of the present invention to provide an improved cat litter that is scented.

It is another object of the present invention to provide an improved cat litter having anti-microbial agents.

It is another object of the present invention to provide an improved cat litter that clumps in a convenient size for easy disposal and which has little dust and reduces tracking by cats.

It is another object of the present invention to provide an improved cat litter which includes manufacture from modified corn starch.

Briefly described according to one embodiment of the present invention, an improved cat litter is provided and includes manufacture from modified corn starch, *Yucca Schidigera*, anti-microbial agents, anti-odor agents, zeolite, distilled dried grains, and calcium carbonate for improving the litter density and for improving cost production.

Modified corn starch is a polysaccharide, which are the most common agents used in providing the cohesiveness, or clumping, of litter when used. Among the suitable agents that may additionally be used for clumping are dextrins, maltodextrins, flours, cellulosics, hemicellulosics, and the many varieties of starches.

*Yucca Schidigera* is a plant typically found in the desert regions of Arizona, California, Nevada, Utah and Mexico. Among its many properties, the *Yucca Schidigera's* ability to bind and neutralize ammonia is relevant to the cat litter formula. Natural saponins, which are emulsifying or foaming agents, are found in the leaves of the *Yucca Schidigera* and are the chemicals responsible for binding and neutralizing the annoying and harmful odors associated with the ammonia formed in the litter after the breakdown of urea, which is found in cat urine. The natural saponins may also act to neutralize the odors associated with cat feces, as *Yucca Scutigera* is also used in animal foods to help neutralize feces odor within the intestinal tract of an animal so that when the feces are passed the odor is less objectionable. In addition to the natural saponins from *Yucca Scutigera*, additional anti-odor agents may be added to further curb the smell generated from waste deposited in the cat litter.

Anti-microbial agents are also added to help curb the initiation and development of microbes that may be harmful to cat and cat owner, such as molds. The anti-microbial agents may come from among sodium propionate, calcium propionate or other known chemicals. In addition to the agents suggested, additional anti-microbial compounds may be included with those already suggested so as to provide maximum protection against the formation of microbes, bacteria or molds.

The general method of manufacture of the cat litter formula is comprised of a mash distillation process and an extrusion technology process. A grain fiber that has been removed of all starch is incorporated with calcium carbonate, which is added for density only. To this mixture is added a modified starch, which creates inter-particle cohesion as well as density and bulk to the product. Zeolite is added for odor control, as well as to attract and trap ammonia. *Yucca schidegira* is added for additional ammonia control. The mixture is then extruded through a pellitizer, but does not need to be ground due to the fact that the material has sufficient inter-particle cohesion to allow particles of a sufficient size to remain, while mere mechanical handling of the product will prevent particles of too large a size to remain.

DETAILED DESCRIPTION OF THE PREFERRED EMBODIMENT

A. Composition

An improved cat litter is provided, according to the present invention, comprised of a composition which includes the following ingredients: polysaccharide (modified corn starch); zeolite; *yucca schidegira*; distillers dried grains; salt compound (calcium carbonate); and anti-microbial agents. The distillers dried grains utilized in the improved cat litter is manufactured via a mash distillation process to be described in greater detail below.

Each of the aforementioned ingredients may have one or more sub-components. For example, the salt compound is preferably calcium carbonate, however, potassium carbonate and calcium carbonate are envisioned as being selected alone or in combination.

*Yucca schidegira*, as a natural saponin, is an emulsifying or foaming agent which functions to inhibit urease enzyme action and to prevent the formation of $NH_3$ (ammonia), thereby binding and neutralizing annoying and harmful odors associated therewith. Yucca schidegira further serves to help neutralize feces odor.

The anti-microbial agents, preferably including sodium propionate and calcium propionate, facilitate protection against the formation of microbes, bacteria, or molds.

Zeolite is a natural mineral consisting of silica and alumina. Zeolite has a unique interconnecting lattice structure arranged to form a honeycomb framework of consistent diameter interconnecting channels and pores. Negatively-charged alumina building blocks and neutrally-charged silica building blocks are stacked thereby producing an open, three dimensional honeycomb framework. Odors and gases such as ammonia are attracted to and trapped within the zeolite crystalline structure. Zeolite also adsorbs and desorbs water, thus eliminating and preventing mildew formation.

Modified corn starch is a polysaccharide, which serves in the production of alcohol and provides cohesiveness, or clumping of litter. While other cereal grains such as wheat, barely, and rye may be selected, modified corn starch is preferred. In addition, other suitable agents facilitating occlusivity or clumping may include a mixture of dextrins, maltodextrins, flours, and arabinoxylans.

B. Method of Manufacture

In practicing the present invention, the general method of manufacture is comprised of a mash distillation process which includes grinding corn into a coarse modified flour called meal. The meal is mixed with water and a malt enzyme, preferably alpha-amylase, and is passed through cookers where starch is liquefied. Heat is applied to enable liquefaction using cookers with a high temperature stage and a lower temperature holding period, wherein a mash product is produced. The high temperature stage facilitates reduced bacteria levels in the mash product. The mash product is then cooled and an additional malt enzyme is added to convert liquefied starch to fermentable sugars. The additional malt enzyme selected includes gluc amylase and beta-amylase, however, gluc amylase is preferred. Yeast, preferably *saccharomyces cerevisiae*, is then added in order to ferment the sugars to ethanol and carbon dioxide. *Saccharomyces cerevisiae* is the preferred yeast species because it facilitates quick, efficient production of alcohol and possesses a high alcoholic concentration tolerance. Fermented mash results and is sent to distillation, wherein ethanol is extracted, leaving spent mash. The spent mash is centrifuged, where liquid is separated therefrom. The liquid, or stillage, is reintroduced into the cooking system and sold as livestock feed, or is partially dehydrated into a syrup. The aforementioned mash distillation process is executed under controlled pH being adjusted and readjusted in a suitable manner as is commonly practiced in such industry.

The mash distillation process creates two main co-products in the production of ethanol, namely carbon dioxide and distillers grains. The distillers grains are rich in protein, fat, minerals, vitamins, and amino acids, and thus serve as a highly valued livestock feed ingredient.

Next, centrifuged spent mash (distillers dried grains) is suitably dried into a powder to which the following ingredients are added to form a litter product: modified corn starch, zeolite, yucca schidegira, calcium carbonate, and anti-microbial agents. The litter product is suitably dried to a powder and is processed through a pelletizer via an extrusion technology process so as to form particles each having a size approximating the size of a grain of wheat. The particles are then bagged and sealed.

C. Example

The following example represents the general formulation for the improved cat litter of the present invention.

| INGREDIENTS | COMPOSITION BY WEIGHT |
| --- | --- |
| Polysaccharide (Modified Corn Starch) | 19.5–21%, preferably 20.00% |
| Zeolite | 4.5–5.5%, preferably 5.00% |
| Yucca Schidegira | 0.15–0.25%, preferably 0.20% |
| Distillers Dried Grains | 71.50–71.75%, preferably 71.70% |
| Calcium carbonate | 2.95–3.05%, preferably 3.00% |
| Anti-microbial Agents | 0.085–0.105%, preferably 0.10% |

D. Operation of the Preferred Embodiment

To use the present invention, user simply opens the improved cat litter from its sealed packaging and pours a suitable volume thereof within a container fabricated of a material specifically adapted for use as an animal litter storage receptacle.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. A method of manufacturing a cat litter composition comprising polysaccharide, zeolite, *yucca schidegira*, distillers dried grains, salt compound, and anti-microbial agents, wherein said method comprises the steps of:
    a. grinding corn into a coarse modified flour called meal;
    b. mixing said meal with water and a malt enzyme, preferably alpha-amylase, and passing said meal through cookers where starch is liquefied;
    c. applying heat to said starch so as to enable liquefaction, and thus producing a mash product;
    d. Cooling said mash product and adding an additional malt enzyme, preferably gluc amylase, in order to convert liquefied starch to fermentable sugars;
    e. adding yeast, preferably *saccharomyces cerevisiae*, in order to ferment said fermentable sugars to ethanol and carbon dioxide, thus producing fermented mash;
    f. distilling said fermented mash wherein said ethanol is extracted so as to leave spent mash;
    g. centrifuging said spent mash wherein stillage is separated from spent mash leaving disillers grains;
    h. reintroducing said stillage into said cookers in order to be sold as livestock feed or partially dehydrated into a syrup;
    i. executing steps 2–8 under controlled pH being adjusted and readjusted in a suitable manner as is commonly practiced in a mash distillation process;
    j. drying said distillers grains into a powder to which modified corn starch, zeolite, *yucca schidegira*, calcium carbonate, and antimicrobial agents are added in order to form an improved litter product;
    k. drying said improved litter product into a powdered product;
    i. pelletizing said powdered product via an extrusion technology process so as to form particles each having a size approximating a size of a grain of wheat; and
    m. bagging and sealing said particles.

2. The cat litter composition of claim 1, wherein said cat litter composition includes:
    19.5 percent to 21 percent polysaccharide composition by weight;
    4.5 percent to 5.5 percent zeolite composition by weight;
    0.15 percent to 0.25 percent *yucca schidegira* composition by weight;
    71.50 percent to 71.75 percent distillers dried grains composition by weight;
    2.95 percent to 3.05 percent salt compound composition by weight; and
    0.085 percent to 0.105 percent anti-microbial agents composition by weight.

3. The cat litter composition of claim 2, wherein said polysaccharide is modified corn starch.

4. The cat litter composition of claim 2, wherein said salt compound calcium carbonate.

5. The cat litter composition of claim 2, wherein said anti-microbial agents include sodium propionate and calcium propionate.

6. The cat litter composition of claim 1, wherein said cat litter composition includes:
    20.0 percent polysaccharide composition by weight;
    5.0 percent zeolite composition by weight;
    0.20 percent *yucca schidegira* composition by weight;
    71.70 percent distillers dried grains composition by weight;
    3.00 percent salt compound composition by weight; and
    0.10 percent anti-microbial agents composition by weight.

7. The cat litter composition of claim 6, wherein said polysaccharide is modified corn starch.

8. The cat litter composition of claim 6, wherein said salt compound is calcium carbonate.

9. The cat litter composition of claim 6, wherein said anti-microbial agents include sodium propionate and calcium proprionate.

* * * * *